United States Patent [19]

Aoyama

[11] Patent Number: 5,307,112
[45] Date of Patent: Apr. 26, 1994

[54] FOCUS DETECTING DEVICE FOR DETECTING FOCUS TO A PLURALITY OF DIFFERENT AREAS

[75] Inventor: Keisuke Aoyama, Yokohama, Japan

[73] Assignee: Canon Kabushiki Kaisha, Tokyo, Japan

[21] Appl. No.: 905,233

[22] Filed: Jun. 29, 1992

Related U.S. Application Data

[63] Continuation of Ser. No. 641,526, Jan. 15, 1991, abandoned.

[30] Foreign Application Priority Data

Jan. 17, 1990 [JP] Japan .................................. 2-8707
Jan. 17, 1990 [JP] Japan .................................. 2-8708

[51] Int. Cl.$^5$ ............................................. G03B 13/00
[52] U.S. Cl. .................................. 354/406; 354/409; 354/474
[58] Field of Search .............................. 354/400–409, 354/474, 475

[56] References Cited

U.S. PATENT DOCUMENTS

| | | | |
|---|---|---|---|
| 4,534,636 | 8/1985 | Sugawara | 354/403 |
| 4,545,212 | 3/1986 | Kitaura et al. | 354/409 |
| 4,746,947 | 5/1988 | Nakai | 354/402 |
| 4,812,912 | 3/1989 | Iida et al. | 358/227 |
| 4,827,303 | 5/1989 | Tsuboi | 354/403 |
| 4,882,601 | 11/1989 | Taniguichi et al. | 354/407 |
| 4,994,843 | 2/1991 | Kitazawa | 354/409 |

FOREIGN PATENT DOCUMENTS

3211234A1 10/1982 Fed. Rep. of Germany .
2077448 12/1981 United Kingdom .

Primary Examiner—David M. Gray
Attorney, Agent, or Firm—Fitzpatrick, Cella, Harper & Scinto

[57] ABSTRACT

This invention relates to a camera having a focus detecting device for independently detecting the focus states at a plurality of different distance measurement points. This invention provides in such camera a selection circuit for selecting the distance measurement points, and an indicating circuit for indicating the distance measurement points selected by the selection circuit, and provides an indicating device for preindicating a distance measurement point selected before the focus detecting operation and indicating the selected distance measurement point again when the selected distance measurement point is judged to be in focus by the focus detecting operation.

17 Claims, 11 Drawing Sheets

FIG. 3A
FIG. 3
| FIG. 3A | FIG. 3B |
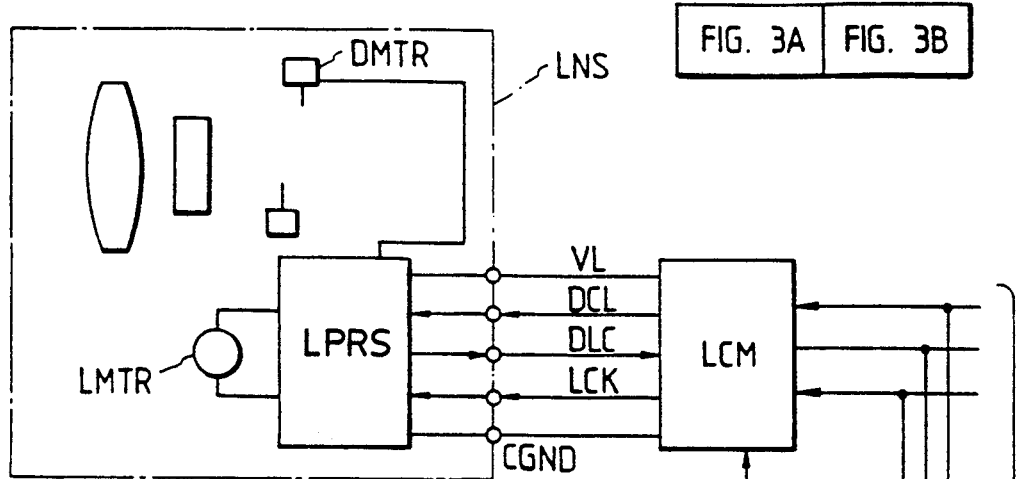
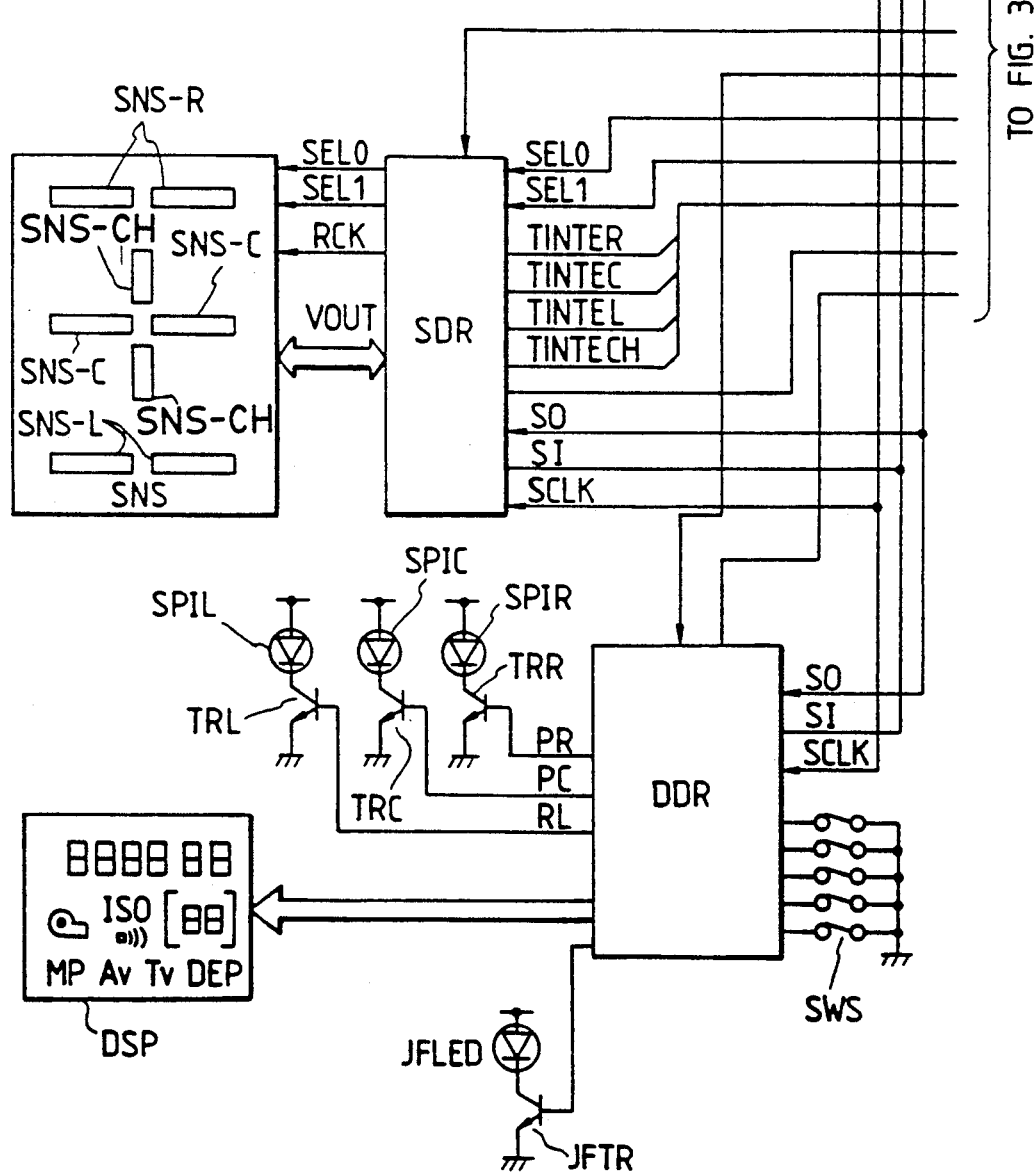

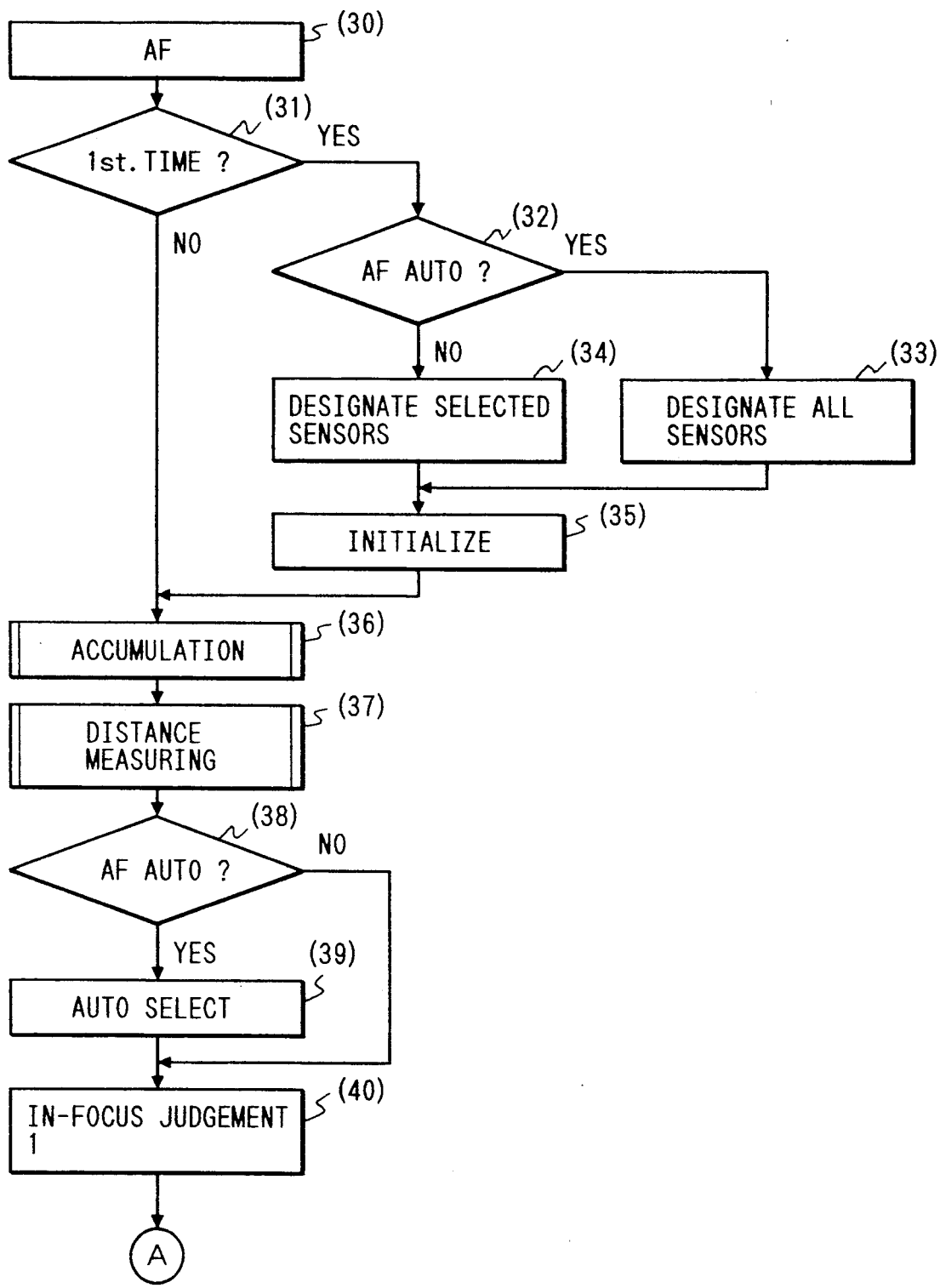

FOCUS DETECTING DEVICE FOR DETECTING FOCUS TO A PLURALITY OF DIFFERENT AREAS

This application is a continuation of application Ser. No. 07/641,526 filed Jan. 15, 1991, now abandoned.

BACKGROUND OF THE INVENTION

1. Field of the Invention

This invention relates to a camera having a multifocus detecting device for detecting the defocus amounts of a plurality of object areas and effecting focus detection.

2. Description of the Related Art

As a focus detecting device in a camera, there is well known a method of causing light beams from an object area passed through the different exit pupil areas of a photo-taking lens to be imaged on a pair of line sensors, and finding the amount of displacement of the relative position of a pair of image signals obtained by photoelectrically converting an object image, to thereby detect the defocus amount of the object area. Also, in the above-described method, there have been a number of methods of preparing a plurality of sets of focus detecting systems (optical systems and sensors) to thereby detect the defocus amounts of a plurality of object areas.

When the detection of the defocus amounts has been effected for said plurality of areas, distance measurement for the plurality of object areas is effected, but since final focus adjustment is directed to an object for one distance measurement area, means for selecting or manually selecting an object area on some judgment conditions from among the plurality of areas is provided on the camera side so that focus adjustment may be effected for one of the object areas.

In this case, there occurs the inconvenience that which area is the selected area cannot be known.

In order to solve this problem, it is necessary, for example, to dispose an indicating means for indicating the selected area in a viewfinder to let the selected area, i.e., the focus-adjusted area, be known. On the other hand, if the construction as described above is adopted, one of a plurality of areas is selected and only that area is indicated and thus, even when there are areas which exhibit defocus amounts approximate to the defocus amount in said selected area, only one area is indicated, and in spite of the fact that objects in a plurality of areas originally exhibit the same or substantially the same defocus amount and if the camera is focused on the object in one of those areas, the camera is also in focus on the objects in the other areas, the photographer becomes unable to know it. Also, when the objects in the respective areas are substantially at the same distance, the area selected changes each time the focus detecting operation is repeated, and the area indicated changes each time, and this leads to the possibility that the photographer thinks that focus detection is done unstably.

SUMMARY OF THE INVENTION

One aspect of the application is to provide an indicating device which is provided with indicating means for indicating which of a plurality of distance measurement areas has been designated and in which said indicating means is driven for a predetermined time at the start of the focus detecting operation and thereafter said indicating means is driven only when an in-focus state is obtained for said designated area so that said indication may not be cumbersome to the photographer when the photographer is informed of the selected area by said indication.

One aspect of the application is to provide an indicating device in which when during the indication for a designated area during said focusing, the defocus amount in other area exhibits a defocus amount approximate to the detected defocus amount in said designated area, that area is indicated by indicating means together with the designated area.

One aspect of the application is to provide an indicating device in which when one of a plurality of areas is manually designated, the designated area is indicated by indicating means before focus detection while, on the other hand, in an auto mode wherein one of the areas is automatically designated in conformity with the focus state, that area is indicated by the indicating means when in-focus is achieved for that area after focus detection.

Other objects of the present invention will become apparent from the following detailed description of an embodiment thereof taken in conjunction with the accompanying drawings.

DESCRIPTION OF THE PREFERRED EMBODIMENT

Figure 1:
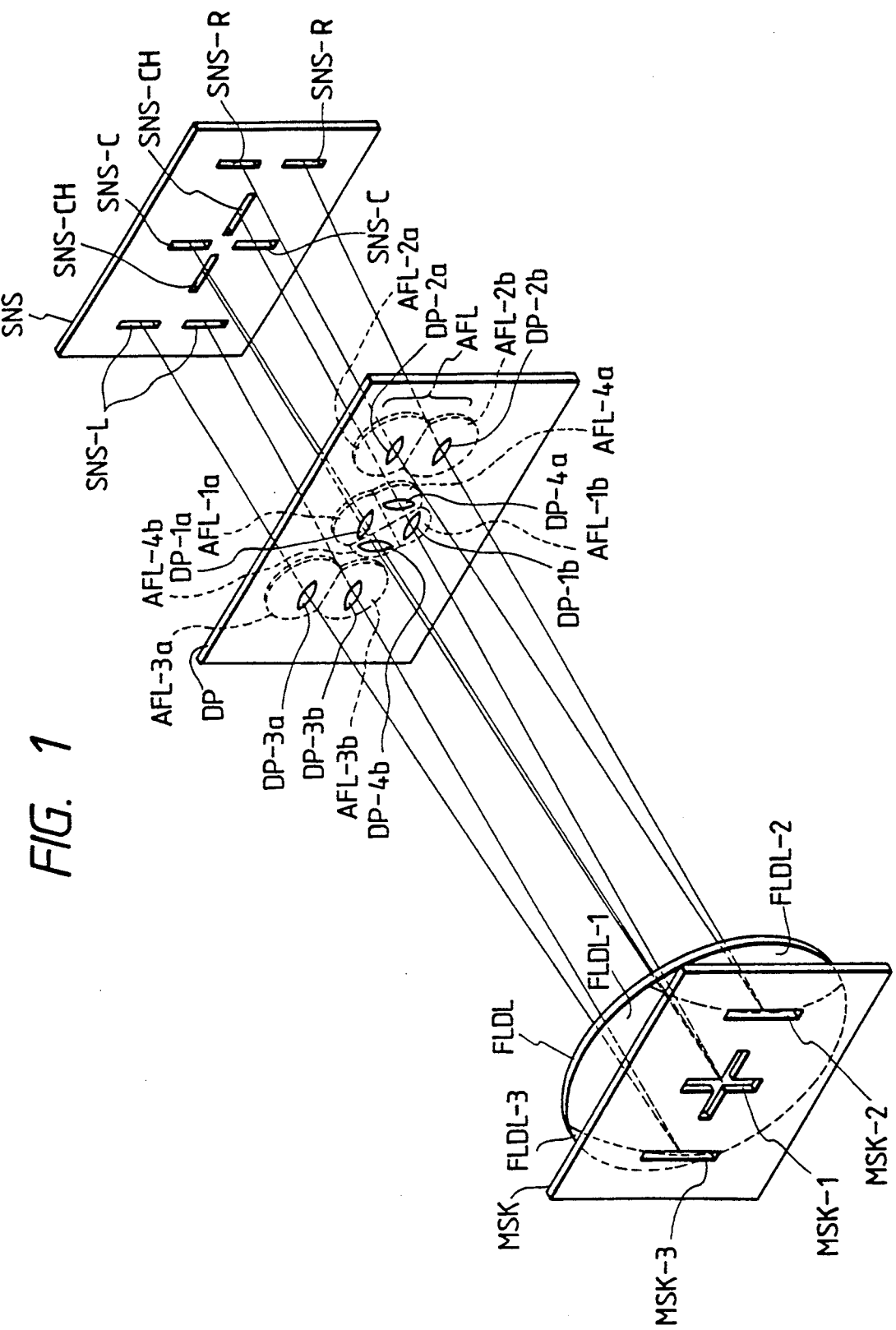
FIG. 1 shows the construction of a focus detecting device adopted in a focus adjusting apparatus according to the present invention.

FIG. 1 schematically shows the construction of a focus detecting device adopted in an automatic focus adjusting apparatus according to the present invention.

In FIG. 1, MSK designates a field mask having a cruciform opening MSK-1 at the center thereof and vertically long openings MSK-2 and MSK-3 in the opposite marginal portions thereof. FLDL denotes a field lens comprising three portions FLDL 1, FLDL-2 and FLDL-3 correspondingly to the three openings MSK-1, MSK-2 and MSK-3 in the field mask. DP designates a diaphragm formed with two vertical and horizontal pairs of openings DP-1a, DP-1b, DP-4a and DP-4b in the central portion thereof and two pairs of openings DP-2a, DP-2b and DP-3a, DP-3b in the right and left marginal portions thereof. The areas FLDL 1, FLDL-2 and FLDL-3 of the field lens FLDL have the function of imaging these pairs of openings DP-1, DP-4, DP-2, DP-3 near the exit pupil of an objective lens, not shown. AFL denotes a secondary imaging lens comprising four pairs of lenses AFL-1a, AFL-1b, AFL-4a, AFL-4b, AFL 2a, AFL-2b, AFL-3a and AFL-3b. The secondary imaging lens AFL is disposed rearwardly of the diaphragm DP correspondingly to the openings in the diaphragm DP. SNS designates a sensor comprising four pairs of sensor arrays SNS-R, SNS-C, SNS-L and SNS-CH and disposed so as to receive the image of each secondary imaging lens AFL correspondingly thereto.

In the focus detecting system shown in FIG. 1, where the focus of a photo-taking lens is forwardly of the film surface, object images formed on each pair of sensor arrays become close to each other, and where the focus of the photo-taking lens is rearwardly of the film surface, the object images become far from each other. The amount of displacement of the relative position of the object images is in a particular functional relation with the amount of out-of-focus of the photo-taking lens and therefore, if in each pair of sensor arrays, suitable calculations are carried out for the sensor outputs thereof, the amount of out-of-focus, i.e., the so-called defocus amount, of the photo-taking lens can be detected.

By adopting the construction a described above, near the center of a range photographed or observed by the objective lens, not shown, distance measurement becomes possible even for an object whose distribution Of quantity of light changes only in one direction such as the vertical or horizontal direction, and distance measurement can also be accomplished for objects lying a locations corresponding to the marginal openings MSK-2 and MSK-3 in the field mask.

Figure 2:
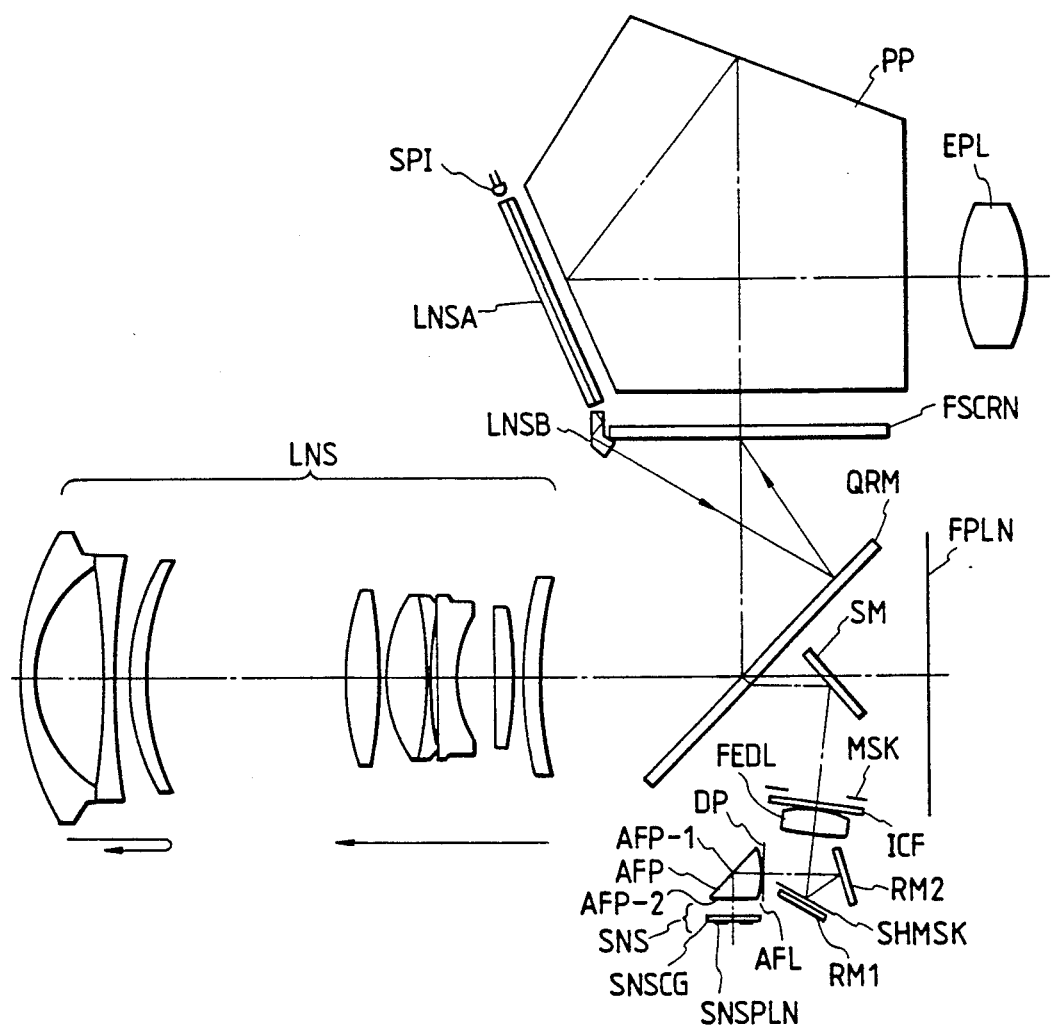
FIG. 2 shows the arrangement when the focus adjusting apparatus according to the present invention is contained in a camera.

FIG. 2 shows the arrangement when the focus detecting device having the focus detecting system of FIG. 1 as contained in a camera.

In FIG. 2, LNS designates a zoom photo-taking lens, QRM denotes a quick return mirror, FSCRN designates a focusing screen, PP denotes a pentaprism, EPL designates an eyepiece, FPLN denotes a film plane, SM designates a sub-mirror, MSK denotes a field mask, ICF designates an infrared cut filter, FEDL denotes a field lens, RM1 and RM2 designate first and second reflecting mirrors, respectively, SHMSK denotes a shield mask, DP designates a diaphragm, AFL denotes a secondary imaging lens, AFP designates a prism member having a reflecting surface AFP-1 and an exit surface AFP-2, and SNS denotes a sensor having cover glass SNSCG and a light receiving surface SNSPLN. The prism member AFP has the reflecting surface AFP-1 formed by depositing reflecting film of a metal such as aluminum by evaporation, and has the function of reflecting a light beam from the secondary imaging lens AFL and deflectinq it to the exit surface AFP 2. SPI designates a light emitting diode, LNSA designates an index gradient type lens array, and LNSB denotes a light projecting lens. The light beam of the light emitting diode SPI is reflected on the quick return mirror QRM through the lens array LNSA and the light projecting lens LNSB, whereafter it illuminates the indicating portion on the focusing screen SCRN.

Figure 3B:
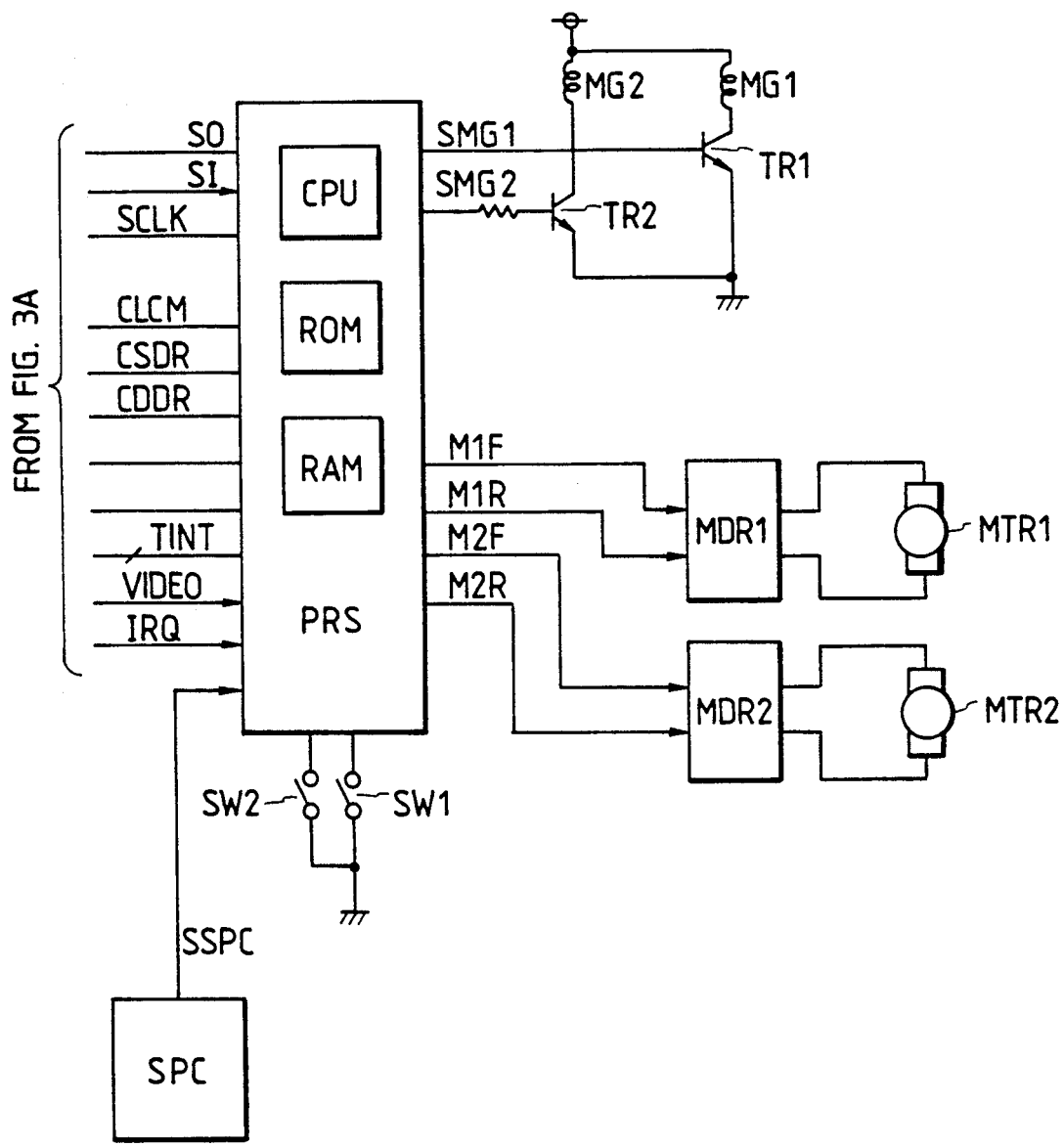
FIG. 3 is a circuit diagram showing an embodiment of a camera provided with the focus detecting device shown in FIG. 1.

FIG. 3 is a circuit diagram showing a specific example of the construction of a camera provided with the focus detecting device as shown in FIG. 1, and the construction of each portion thereof will first be described.

In FIG. 3, PRS designates a controller for the camera, which controller is for example a 1-chip type microcomputer (hereinafter referred to as the microcomputer) having therein a CPU (central processing unit), a ROM, a RAM and an A/D converting function. The microcomputer PRS performs a series of operations of the camera such as the automatic exposure control function, the automatic focus adjusting function and the winding and rewinding of film in accordance with the sequence program of the camera stored in the ROM. For that purpose, the microcomputer PRS effects communications with the surrounding circuits in the camera body and the controller in the lens by the use of signals for communication SO, SI and SCLK and communication selection signals CLCM, CSDR and CDDR.

SO is a data signal output from the microcomputer PRS, SI is a data signal input to the microcomputer PRS, and SCLK is a synchronizing clock for the signals SO and SI.

LCM designates a lens communication buffer circuit which supplies electric power to a power source terminal VL for the lens when the camera is operating, and which provides a communication buffer between the camera and the lens when the selection signal CLCM from the microcomputer is at a high potential level (hereinafter referred to as "H", and a low potential level will hereinafter be referred to as "L").

When the microcomputer PRS sets the selection signal CLCM to "H" and delivers predetermined data as the signal SO in synchronism with SCLK, the buffer circuit LCM outputs the buffer signals LCK and DCL of SCLK and SO, respectively, to the lens through the communication contact between the camera and the lens. Simultaneously therewith, it outputs the buffer signal of the signal DLC from the lens LNS as the signal SI, and the microcomputer PRS inputs the signal SI as the data of the lens in synchronism with SCLK.

DDR denotes a switch detecting and indicating circuit which is selected when signal CDDR is at "H", and is controlled from the microcomputer PRS by the use of SO, SI and SCLK.

When there is a change in the state of a switch SWS, the circuit DDR sets IRQ to "L" and informs the microcomputer PRS that there has been a change in the state of the switch. The microcomputer PRS communicates a switch changed state transmission command by SO, SI and SCLK and detects the changed state of the switch.

When it receives the switch changed state transmission command, the circuit DDR outputs the changed state of the switch to the microcomputer PRS and restores IRQ to "H".

The microcomputer PRS communicates a display command and display data to the circuit DDR by the use of SO, SI and SCLK to thereby effect display control. When it receives the display command and the display data, the circuit DDR switches on and off an external display member DSP and transistors TR-L, TR-C and TR-R for driving the display in the viewfinder, in conformity with that command.

SW1 and SW2 designate switches operatively associated with a release button, not shown, and the switch SW1 is closed by the first-stage depression of the release button, and the switch SW2 is closed by the second-stage depression of the release button. The microcomputer PRS effects photometry and automatic focus adjustment upon the closing of the switch SW1, and effects exposure control and thereafter the winding of the film with the closing of the switch SW2 as a trigger.

The switch SW2 is connected to the "interruption input terminal" of the microcomputer PRS and thus, even when the program during the closing of the switch SW1 is being executed, interruption is applied by the closing of the switch SW2 and immediately the control can be shifted to a predetermined interruption program.

MTR1 denotes a film feeding motor, and MTR2 designates a motor for mirror up and down and for shutter spring charge, and the forward rotation and reverse rotation thereof are controlled by their respective driving circuits MDR1 and MDR2. Signals M1F, M1R, M2F and M2R input from the microcomputer PRS to the driving circuits MDR1 and MDR2 are signals for controlling the motors.

MG1 and MG2 denote magnets for starting the movement of the forward and rearward shutter curtains. These magnets are electrically energized by signals SMG1 and SMG2 and amplifying transistors TR1 and TR2, and shutter control is effected by the microcomputer PRS. LPRS designates a control circuit in the lens. A signal DCL input to this circuit LPRS in synchronism with LCK is command data from the camera to the photo-taking lens LNS, and the operation of the lens to the command is predetermined.

The control circuit LPRS analyzes that command in accordance with a predetermined procedure, and effects the operations of focus adjustment and aperture control, and the outputting of the operative situations of the various portions of the lens (such as the driving situation of the focus adjusting optical system and the driven state of the diaphragm) and various parameters (such as the fully open F-number, the focal length, and the coefficient of the defocus amount vs. the amount of movement of the focus adjusting optical system) from the output DLC.

Therefore, once a command for focus adjustment has been sent from the camera, the microcomputer PRS which is the controller for the camera need not be concerned at all in the lens driving until the driving of the lens is terminated.

LTMR denotes a motor for moving the focus adjusting optical system in the direction of the optic axis thereof to thereby effect focus adjustment. This motor LTMR is controlled by the control circuit LPRS.

Also, when a command for aperture control is sent to LPRS from the camera, the control circuit LPRS drives a conventional stepping motor DMTR for diaphragm driving in accordance with the number of aperture steps sent thereto at the same time. SPC designates a photometric sensor for exposure control which receives the light from an object passed through the photo-taking lens. The output SSPC of the photometric sensor SPC is input to the analog input terminal of the microcomputer PRS and is A/D-converted thereby, whereafter it is used for automatic exposure control in accordance with a predetermined program.

SDR designates a driving circuit for the focus detecting line sensor device SNS, and this driving circuit SDR is selected when signal CSDR is at "H", and is controlled from the microcomputer PRS by the use of SO, SI and SCLK.

Signals SEL0 and SEL1 imparted from the driving circuit SDR to the sensor device SNS are the signals SEL0 and SEL1 themselves from the microcomputer PRS, and they are signals which select the pair of sensor arrays SNS-R when SEL0="L" and SEL1="L", select the pair of sensor arrays SNS-C when SEL0="H" and ØSEL1="L", select the pair of sensor arrays SNS-L when SEL0="L" and SEL1="H", and select the pair of sensor arrays SNS-CH when SEL0="H" and SEL1="H".

After the termination of accumulation, the signals SEL0 and SEL1 are suitably set, and then a read-out clock RCK is sent, whereby the image signals of the pair of sensor arrays selected by SEL0 and SEL1 are serially output from an output VOUT. The output VIDEO of the sensor driving circuit SDR is an image signal amplified by a gain determined by the luminance of the object after the difference between the image signal VOUT from the sensor device SNS and a dark current output has been taken out. Said dark current output is the output value of a picture element in the sensor array which has been shielded from light, and the sensor driving circuit SDR retains its output in a capacitor by a signal from the microcomputer PRS, and effects the differential amplification of this output and the image signal. The output VIDEO is input to the analog input terminal of the microcomputer PRS, and the microcomputer PRS A/D-converts said signal and thereafter successively stores the digital value thereof into a predetermined address on the RAM.

Signals TINTER, TINTEC, TINTEL and TINTECH are signals which are made adequate by charges accumulated in the pairs of sensor arrays SNS-R, SNS-C, SNS-L and SNS-CH, respectively, and which are indicative of the fact that the accumulation has been terminated, and in response to these signals, the microcomputer PRS executes the reading-out of the image signal. The operations of the sensor driving circuit SDR and the sensor device SNS are disclosed as a focus detecting device having two pairs of sensor arrays by the applicant in Japanese Laid-Open Patent Application No. 63-216905, etc. and therefore need not be described in detail herein.

In the manner described above, the microcomputer PRS receives the image information of the object images formed on each pair of sensor arrays, whereafter it effects a predetermined focus detection calculation and can know the defocus amount of the photo-taking lens.

The automatic focus adjusting apparatus of the camera constructed as described above will now be described with reference to FIGS. 4A and 4B which are the flow charts of the main sequence of the present embodiment.

(1) When the main switch of the camera is closed, the initial setting of the camera is effected and the main loop (step (2)) is entered.

(2) Whether a photometry and distance measurement switch (hereinafter referred to as SW1) is closed is first checked up. If SW1 is ON, advance is made to a step (13), and if SW1 is OFF, the program branches off to a step (3).

(3) In-focus indication is turned off (if in-focus indication was turned on in the past, it is turned off here).

(4) Whether a distance measurement field selection switch is closed is checked up, and if it is ON, the program branches off to a step (5), and if it is OFF, the program branches off to a step (6). The distance measurement field selection switch is one of the group of switches SWS in FIG. 3.

(5) If the distance measurement field selection switch is ON, the distance measurement field select mode is entered. The distance measurement field select mode flag (SELECT-MODE) is set.

(6) If the distance measurement field selection switch is OFF, whether the distance measurement field select mode has already been entered is checked up. If the distance measurement field select mode flag (SELECT-MODE) is set, the program proceeds to a step (7), and if said flag is cleared, the program branches off to a step (11).

(7) If the distance measurement field is changed by a distance measurement field changing switch, the program branches off to a step (8). The change of the distance measurement field is effected by a dial switch.

Besides the change of the distance measurement field the setting of the distance measurement field automatic select mode for automatically changing over the distance measurement field is also effected.

(8) When the distance measurement field is changed, a memory for memorizing the distance measurement sensor used is rewritten.

(9) The indication in the viewfinder corresponding to the distance measurement field used in distance measurement (hereinafter referred to as the SI indication) is turned on.

(10) Whether the main switch of the camera is ON is checked up, and if it is ON, return is made to the step (2), where the main loop is repetitively executed. If the main switch is OFF, the operation of the camera is stopped.

(11) If at the step (6), the mode is not the distance measurement field select mode, other switch is checked up, and if said other switch is ON, the program proceeds to a step (12), and if said other switch is OFF, the program branches off to a step (10).

The other switches have no direct relation with the present invention and therefore need not be described in detail.

(12) An operation conforming to the switch which has been closed is performed and advance is made to the step (10).

The operations of the steps (7), (8) and (9) will now be described in detail. These steps are executed with the distance measurement field selection mode entered as described above. At the step (7), the ON or OFF state of a switch adapted to be closed and opened in response, for example, to the rotation of an operation dial provided externally of the camera (predetermined one of the group of switches SWS) is detected by the microcomputer PRS through the communication between the circuit DDR and the microcomputer PRS. When said dial operation is detected at the step (7), advance is made to the step (8) as described above. In the present embodiment, the central vertical sensors SNS-C, the horizontal sensors SNS-CH and the right and left sensors SNS-R and SNS-L are provided as sensors and three portions (left, central and right) are the distance measurement fields, and each time the detection of the dial operation is effected, the left, central and right sensors and all sensors are cyclically designated in succession and the designated sensors are memorized. The designation of all sensors means the designation of the automatic select mode. At the step (9), communication is done from the microcomputer PRS to the circuit DDR to drive transistors TRL, TRC and TRL corresponding to the sensors memorized at the step (8), and one of light emitting diodes SPIL, SPIC and SPIL corresponding to the memorized sensors is selected and turned on, thereby indicating the selected field in the viewfinder as will be described later. It is to be understood that when all sensors are designated, that is, when the mode is the automatic select mode, the light emitting diodes are maintained in their non-turned on state.

At the steps (7)–(9), the distance measurement field selected by the photographer is indicated in the viewfinder as described above.

Description will now be made of a case where the switch SW has been closed. In this case, the program branches off from the step (2) to a step (13).

(13) The distance measurement field select mode flag is cleared to release the distance measurement field select mode.

(14) SI indication is turned off. Thereby, the selected and turned-on light emitting diode is turned off.

(15) Whether the current step is the first execution of a step (15) after the switch SW1 has been depressed is judged. If it is the first execution, advance is made to a step (16), and after the second execution, the program branches off to a step (20).

(16) Whether the distance measurement field is designated is judged. If the distance measurement field is designated, advance is made to a step (17), and if the distance measurement field is in the automatic select mode, the program branches off to the step (20).

(17) If the distance measurement field is designated, SI indication corresponding to the distance measurement field is effected in the same manner as at the step (9).

(18) The program waits for a predetermined time while effecting SI indication.

(19) SI indication is turned off after the program has waited for the predetermined time at the step (18).

At steps (17)–(19), SI indication is effected for a predetermined time to thereby effect the indication of the distance measurement field, and in the case of the automatic select mode, the indication is not effected.

(20) The AF subroutine is called and in the case of the focus detecting operation and the automatic selection, the selection and calculation of the distance measurement field are effected. The AF subroutine will be described later.

(21) Whether the result of the focus detection is in-focus is judged.

If the result of the focus detection is in-focus, JF flag is set in the AF subroutine and here, judgment is done by the JF flag.

If the JF flag is cleared, advance is made to a step (22), and if the JF flag is set, the program branches off to a step (23).

(22) If the result of the focus detection is non-in-focus, the in focus indication is turned off and the main loop is repeated.

(23) Whether the result of the focus detection has been in-focus in the previous cycle is judged. If the result of the focus detection is in-focus also in the previous cycle, advance is made to a step (28), and if the result of the focus detection is non-in-focus in the previous cycle and in-focus in the current cycle, the program branches off to a step (24).

(24) The in focus indication is turned on. This in focus indication is executed by turning on the transistor JFTR by a signal from the circuit DDR to thereby turn on the light emitting diode JFLED.

(25) SI indication is turned on.

If the distance measurement field is designated, SI indication corresponding to the ID designated distance measurement field is effected, and in the case of the automatic distance measurement field selection, SI indication corresponding to the distance measurement field determined by the automatic select routine is effected.

(26) The program waits for a predetermined time.

(27) SI indication is turned off.

(28) Whether the release switch (SW2) is ON is checked up.

If the release switch SW2 is ON, the release process, not shown, is carried out.

If the release switch SW2 is OFF, the main loop is repeated.

Figure 4A:
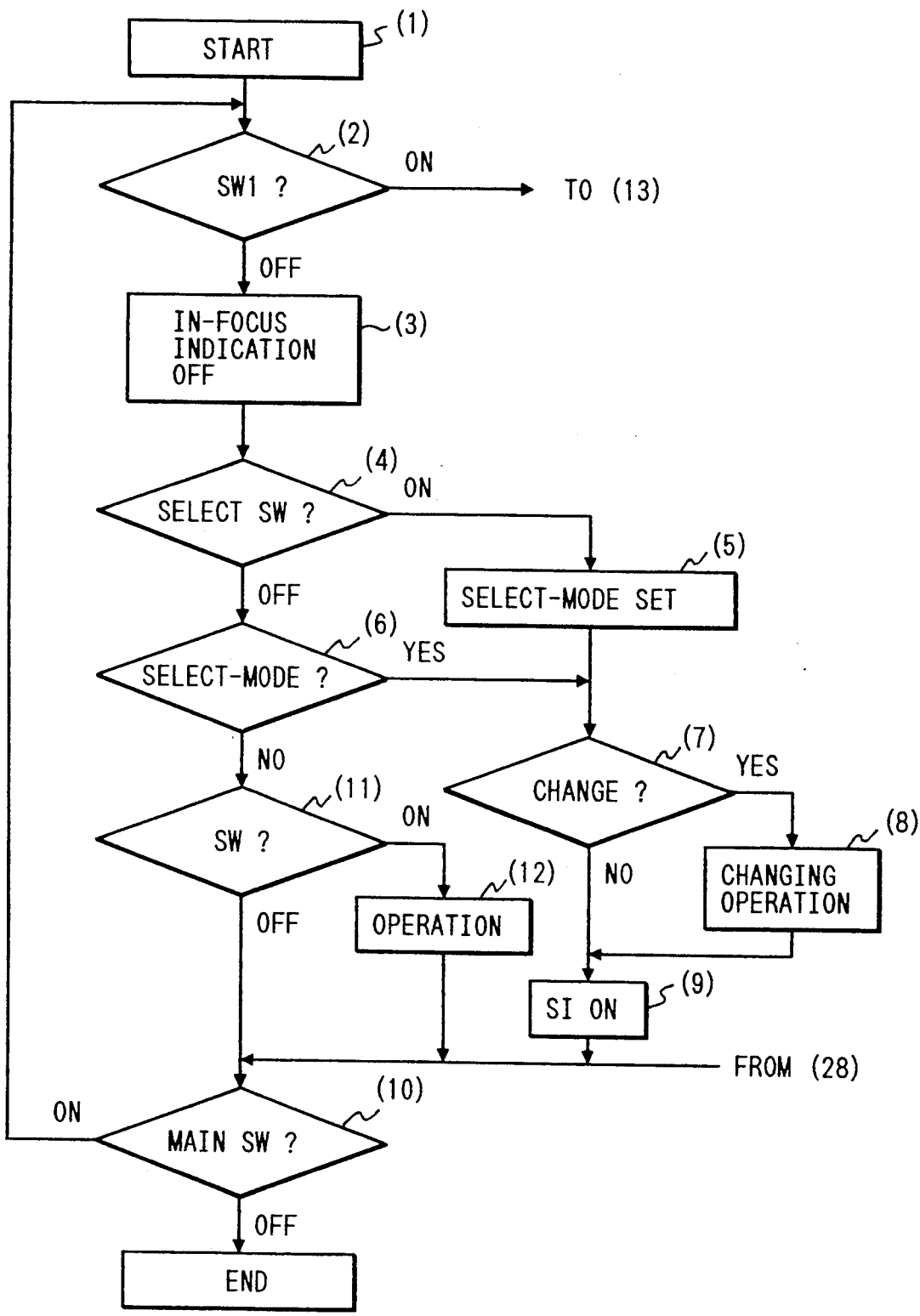
FIGS. 4 and 5 are flow charts for illustrating the operation of the camera shown in FIG. 3.
Figure 4B:
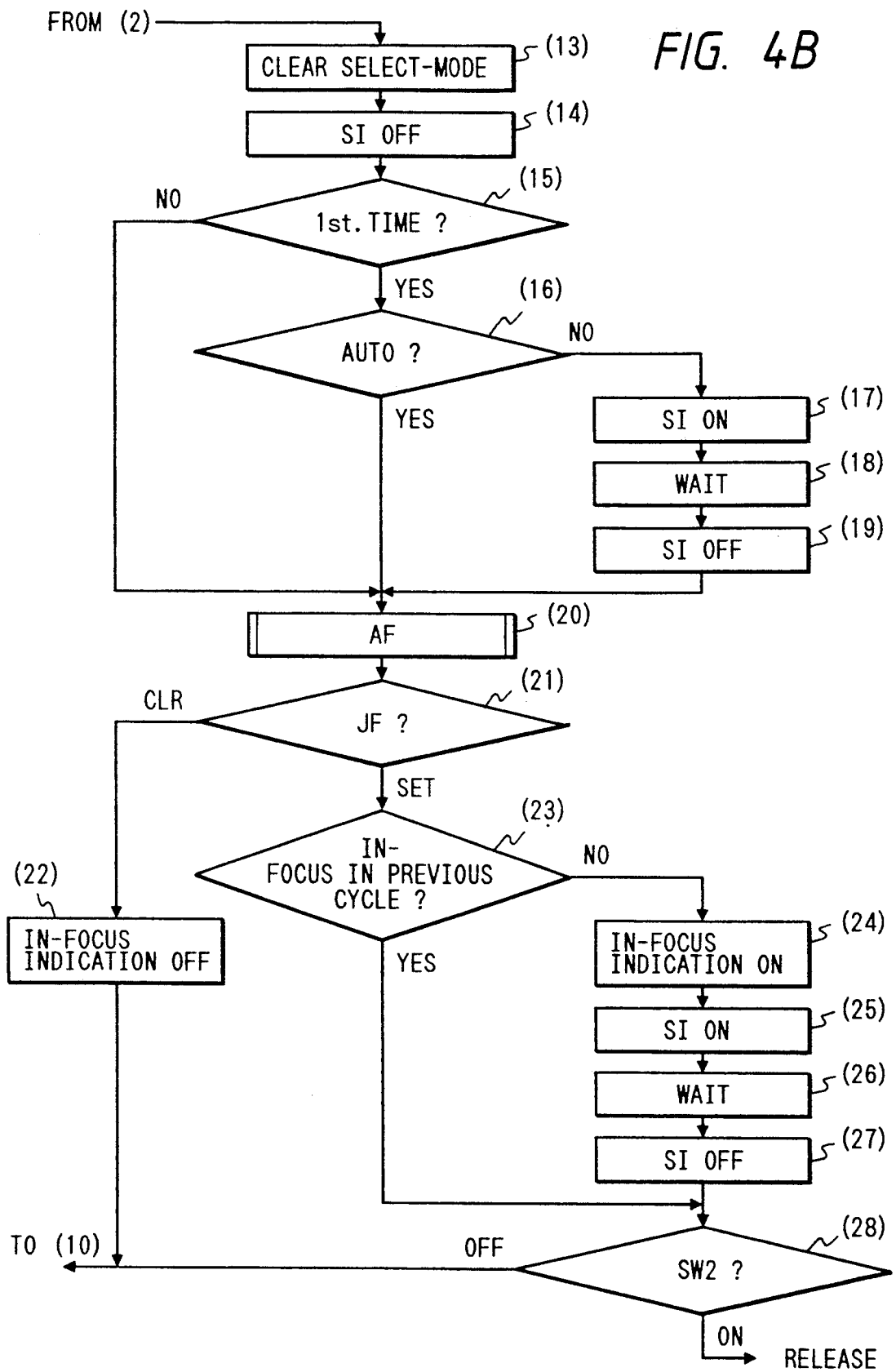
Figure 5B:
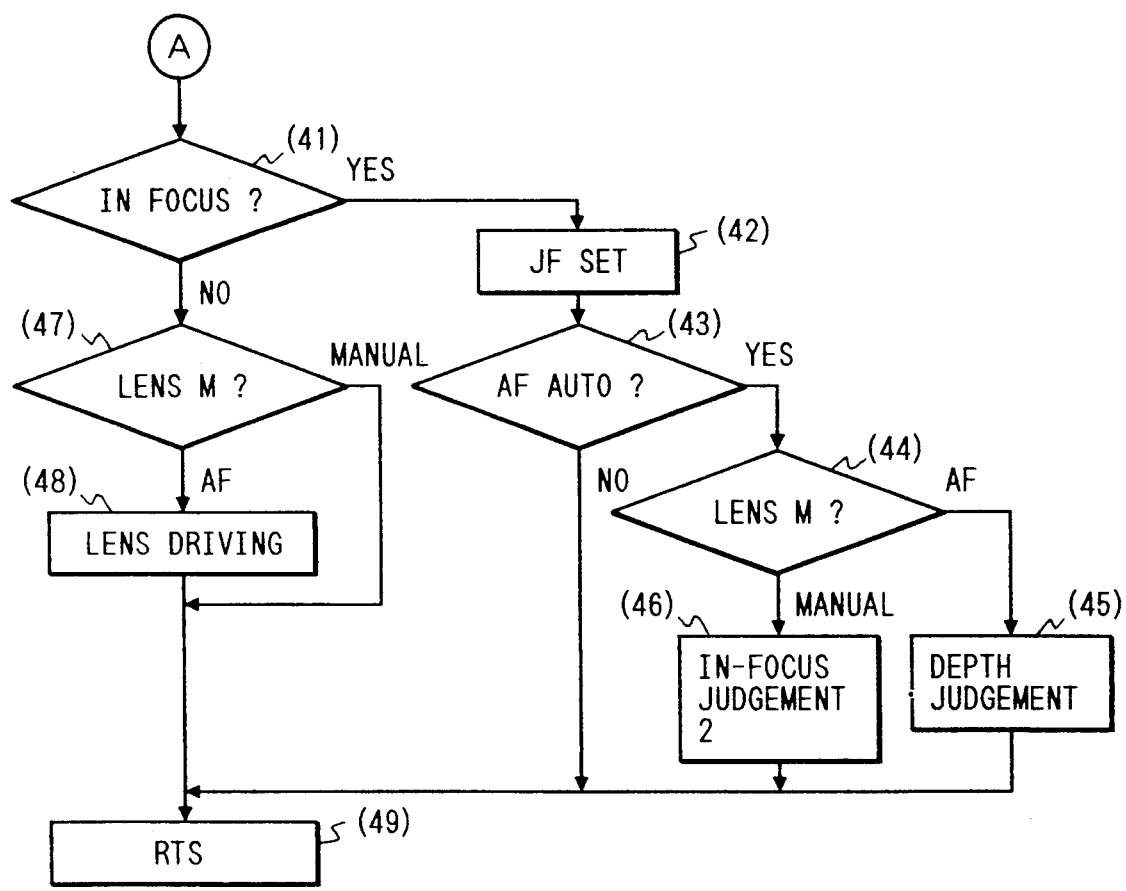

FIG. 5 is a flow chart showing the focus detecting operation at the step (20) of FIG. 4B. The focus detecting operation will hereinafter be described with reference to FIG. 5.

(30) AF starts.

Focus detection is effected by repetitively executing the AF routine.

(31) Whether AF is the first time is judged. If it is the first time, advance is made to a step (32), and after the second time, the program branches off to a step (36).

(32) Whether the distance measurement field is designated or the mode is the automatic select mode is judged. In the case of the automatic select mode, advance is made to a step (33), and if the distance measurement field is designated, the program branches off to a step (34).

(33) In the case of the automatic distance measurement field select mode, focus detection is effected by all distance measuring sensors.

Flags corresponding to all sensors are set.

(34) If the distance measurement field is designated, only the flag of the distance measuring sensor corresponding to the designated distance measurement field is set.

(35) The parameter for focus detection is cleared and the initialization of the sensors is effected.

(36) The accumulation routine of the sensors is called.

In this routine, the accumulation in the sensor which has been flag-designated at the step (33) or (34) is effected and after the termination of the accumulation, the sensor signal is read in while being A/D-converted. Further, the sensor signal is corrected and converted into data suitable for focus detection.

(37) Focus detection calculation is effected from the sensor signal obtained at the step (36), by a known calculating method. The defocus amount of the distance measurement field designated in this subroutine is detected.

(38) Whether the mode is the automatic distance measurement field select mode is judged.

If the distance measurement field is automatically selected, advance is made to a step (39), and if the distance measurement field is designated, the step (39) is not executed, but the program branches off to a step (40).

(39) The distance measurement field select routine is called. In the distance measurement field select routine, a distance measurement field is selected from among calculated defocus amounts in accordance with predetermined algorithm. The selection of one of the defocus amounts which is indicative of an object at the shortest distance and the selection of the field for said one defocus amount are adopted as the distance measurement field selection algorithm.

(40) Judgment of in-focus is done.

If the distance measurement field is designated, whether the defocus amount of the designated distance measurement field is within the in-focus range is judged, and in the case of the automatic distance measurement field selection, whether the defocus amount of the selected distance measurement field is within the in-focus range is judged.

(41) Depending on the result of the judgment at the step (40), the program branches off.

In the case of in-focus, the program proceeds to a step (42), and in the case of non-in-focus, the program branches off to a step (47).

(42) In the case of in-focus, JF flag is set.

(43) Whether the mode is the automatic distance measurement field selection is judged.

In the case of the automatic selection, the program proceeds to a step (44), and if the distance measurement field is designated, the program proceeds to a step (49).

(44) Whether the mode of the lens is auto focus or manual focus is judged. If it is auto focus, the program proceeds to a step (45), and if it is manual focus, the program branches off to a step (46).

(45) The depth judgment routine is called.

In this routine, if the distance measurement field is the automatic select mode and the auto focus mode is set, when the difference between the defocus amount of the automatically selected distance measurement field and the defocus amount of other distance measurement field is within a predetermined threshold value, the indicating flag corresponding to that distance measurement field is turned on.

(46) The in-focus range judgment routine is called.

In this routine, if the mode of the lens is manual focus, whether the defocus amounts of the other distance measurement fields than the automatically selected one are within the in-focus range is judged, and an indicating flag corresponding to the field which is within the in-focus range is turned on.

(47) Whether the mode of the lens is the auto focus mode or the manual focus mode is judged, and if it is the auto focus mode, advance is made to a step (48), and if it is the manual focus mode, advance is made to a step (49).

In this routine, the amount of lens driving is calculated from the defocus amount of the selected distance measurement field and lens driving is effected.

(49) Return is made to the main routine.

Summing up, the operations by the steps of the above described flows are as follows.

First, if the distance measurement field is manually selected, when the switch SW1 is closed, one of the light emitting diodes SPIL, SPIC and SPIR is turned on for a predetermined time and the field selected at the steps (17), (18) and (19) is indicated in the viewfinder. Thereafter, in the AF subroutine, the defocus amount in the manually selected distance measurement field is found and whether the lens is in focus is judged on the basis of the defocus amount in that field, and if the lens is not in focus, the lens is driven by an amount corresponding to that defocus amount. Then the focus detecting operation is again repeated. During this repeated focus detection, advance is made from the step (15) to the step (20) and thus, SI indication is not effected.

When it is judged in the above-described in-focus judgment that the lens is in focus, advance is made to steps (21) and (23) through steps (42) and (43). If it has not been judged in the previous focus detection that the lens is in focus, steps (24)–(27) are executed at this time and the light emitting diode JFLED for in-focus indication is turned on and also the diode corresponding to the selected field is turned on for a predetermined time. Thereafter, the above-described operations are repeated, but if the lens is in focus at the last time and the lens is also in focus at this time, the steps (24)–(27) are not executed and thus, SI indication is not effected.

Also, in the case of the manual focus mode, lens driving is not done but the above-described indicating operation is performed. It is to be understood that the auto focus and the manual focus mode are selected by a mode setting switch provided in the lens LNS.

Description will now be made of a case where the mode is the automatic select mode and the auto focus mode.

In this case, the SI indication when the switch SW1 is ON is not executed, but advance is made to the AF subroutine. Among the defocus amounts of the respective distance measurement fields, the defocus amount of a predetermined field is selected at a step (39) and whether this selected defocus amount can be regarded as in-focus is judged at a step (41), and if it is judged as in-focus, steps (42), (43), (44) and (45) are executed. At these steps, a field which exhibits a defocus amount within a predetermined value relative to said selected defocus amount is judged. Thus, during the indication at the steps (24)–(27), both of the automatically selected field and a field which exhibits a defocus amount approximate to the defocus amount of said field are SI-indicated for a predetermined time.

Description will now be made of a case where the manual mode is selected.

In this case, if the defocus amount of the automatically selected field is judged as in-focus, whether the defocus amounts of the other fields are also in-focus is judged at a step (46). Thus, when the selected field is in focus, SI indication is effected for each field which has been judged as in-focus.

The details of SI indication will now be described.

Figure 8:
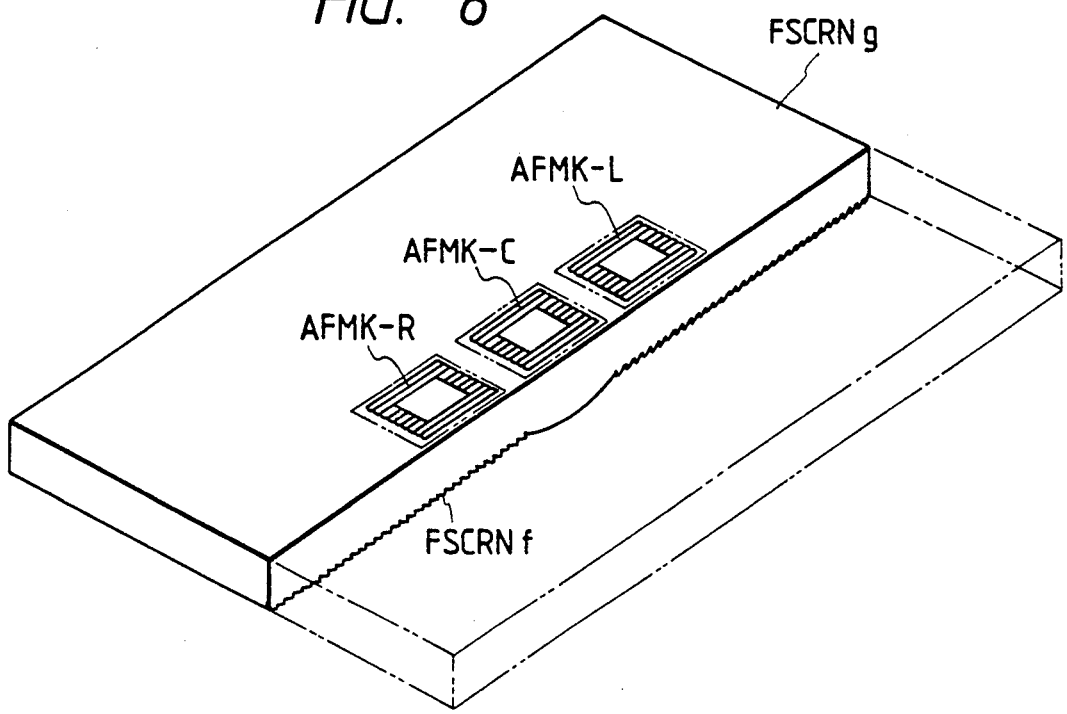
FIG. 8 shows the construction of the focusing screen shown in FIG. 6.
Figure 9:
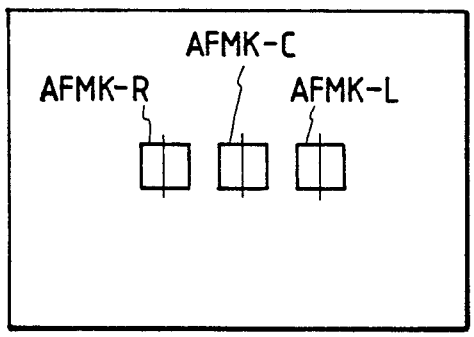
FIG. 9 shows the construction of the indicating portion of the focusing screen shown in FIG. 6.

On the light entrance surface side of the focusing screen FSCRN in the present embodiment, there is provided a Fresnel lens FSCRN-f as shown in FIG. 8, and on the light exit surface side thereof, there is formed a light diffusing surface FSCRN-g as shown in FIG. 8. Also, on the light exit surface, an indicating member comprising three indicating portions AFMK-R, AFMK-C and AFMK-L is provided correspondingly to each distance measurement field. The indicating portions AFMK-R, AFMK-C and AFMK-L, as shown in FIG. 9, indicate areas showing the distance measurement ranges in the photographing picture plane, and each of them is comprised of a number of prism aggregates. The indicating portions AFMK-R, AFMK-C and AFMK-L are disposed so that the ridgelines of the prisms constituting the indicating portions may be substantially orthogonal to the direction of the ridgeline of the Fresnel lens FSCRN-f.

Thus, the indicating portions efficiently direct an illuminating light beam which will be described later to the eyepiece side by the refracting action of the prisms thereof and also, good observation of the indicating portions and the object image is accomplished in such a manner that ghost light created from the ridgeline of the Fresnel lens does not enter the eyepiece side.

As a method of illuminating the indicating portions AFMK-R, AFMK-C and AFMK-L in the present embodiment, a light beam from the light emitting diode SPI is directed onto the quick return mirror QRM through the lens array LNSA and the light projecting lens LNSB shown in FIG. 2, is reflected by the quick return mirror QRM and thereafter illuminates selected predetermined one of the indicating portions AFMK-R, AFMK-C and AFMK-L of the focusing screen FSCRN. The indicating portions are observed through the viewfinder system together with the object formed on the focusing screen FSCRN.

Figure 6:
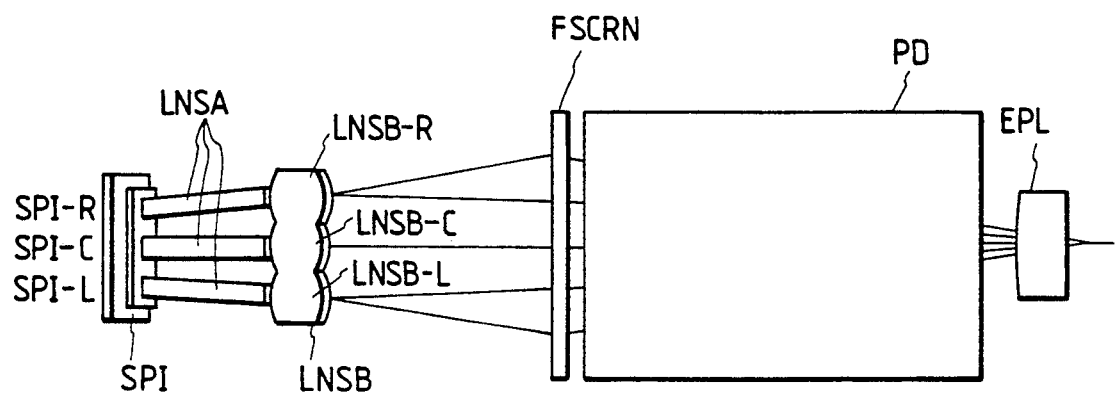
FIG. 6 is a plan view in which the optical paths of the viewfinder system and the illuminating system shown in FIG. 2 are developed.
Figure 7:
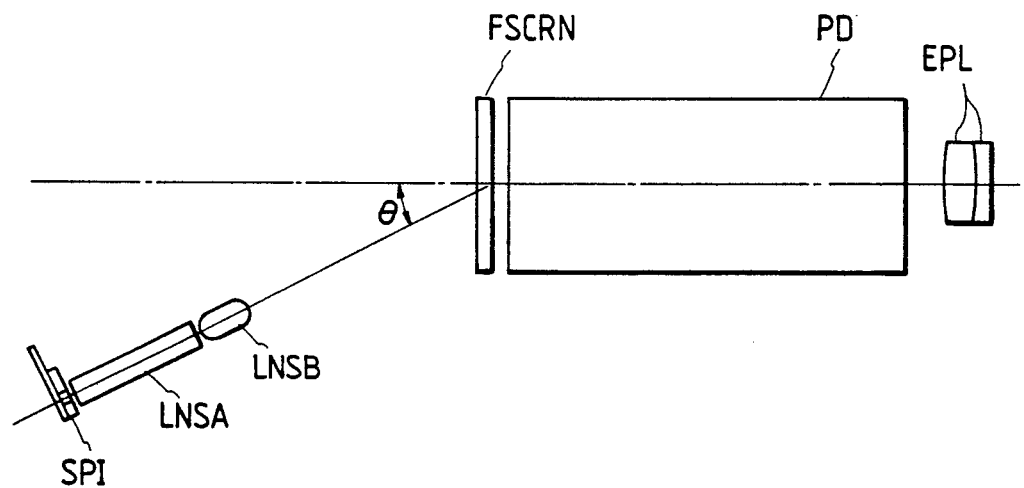
FIG. 7 is a side view in which the development of FIG. 6 is seen from a side.

FIGS. 6 and 7 are schematic views in which the optical paths of the viewfinder system and the illuminating system shown in FIG. 2 are developed, FIG. 6 being a plan view, and FIG. 7 being a side view seen from a side thereof. As shown in FIG. 6, the light projecting lens LNS is comprised of three lens portions LNSB-R, LNSB-C and LNSB-L. The light projecting lens LNSB selects and illuminates any one of the three areas AFMK-R, AFMK-C and AFMK-L on the focusing screen FSCRN. Also, the light projecting lens LNSB, as shown in FIG. 7, illuminates the focusing screen FSCRN from an oblique direction at an angle $\theta$.

The indicating portions AFMK-R, AFMK-C and AFMK-L on the focusing screen FSCRN illuminated by the light projecting lens LNSB are each comprised of an aggregate of a number of prisms, and refract the illuminating light which has entered each prism to thereby direct it toward the eyepiece EPL. Thereby it accomplishes bright indication.

Also, one of the indicating portions AFMK-R, AFMK-C and AFMK-L is selectively illuminated by the light emitting diodes SPI-R, SPI-C, SPI-L and the light projecting lens LNSB, whereby it is made possible that the currently selected distance measurement field is indicated, for example, in red and the other fields are indicated in black.

By the SI indication system being thus constructed, the selected field or the in-focus field is superimpose-indicated in the viewfinder together with the object image by the above-described operation.

Figure 10:
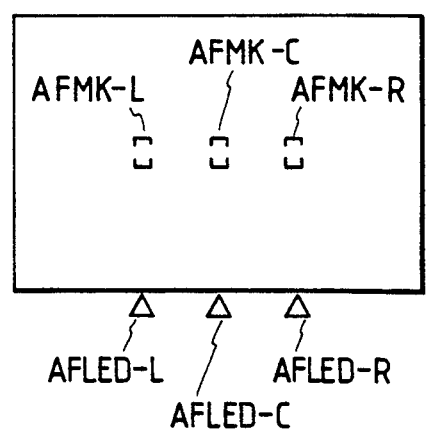
FIG. 10 shows the construction of another example of the indicating portion in the viewfinder.

FIG. 10 shows another example of the SI indication in the viewfinder. Distance measurement frame designating LEDs AFLED-R, AFLED-C and AFLED-L are provided below the distance measurement frames AFMK-R, AFMK-C and AFMK-L, respectively, within the viewfinder so that they may be indicated by the above-described SI indication operation.

Figure 11:
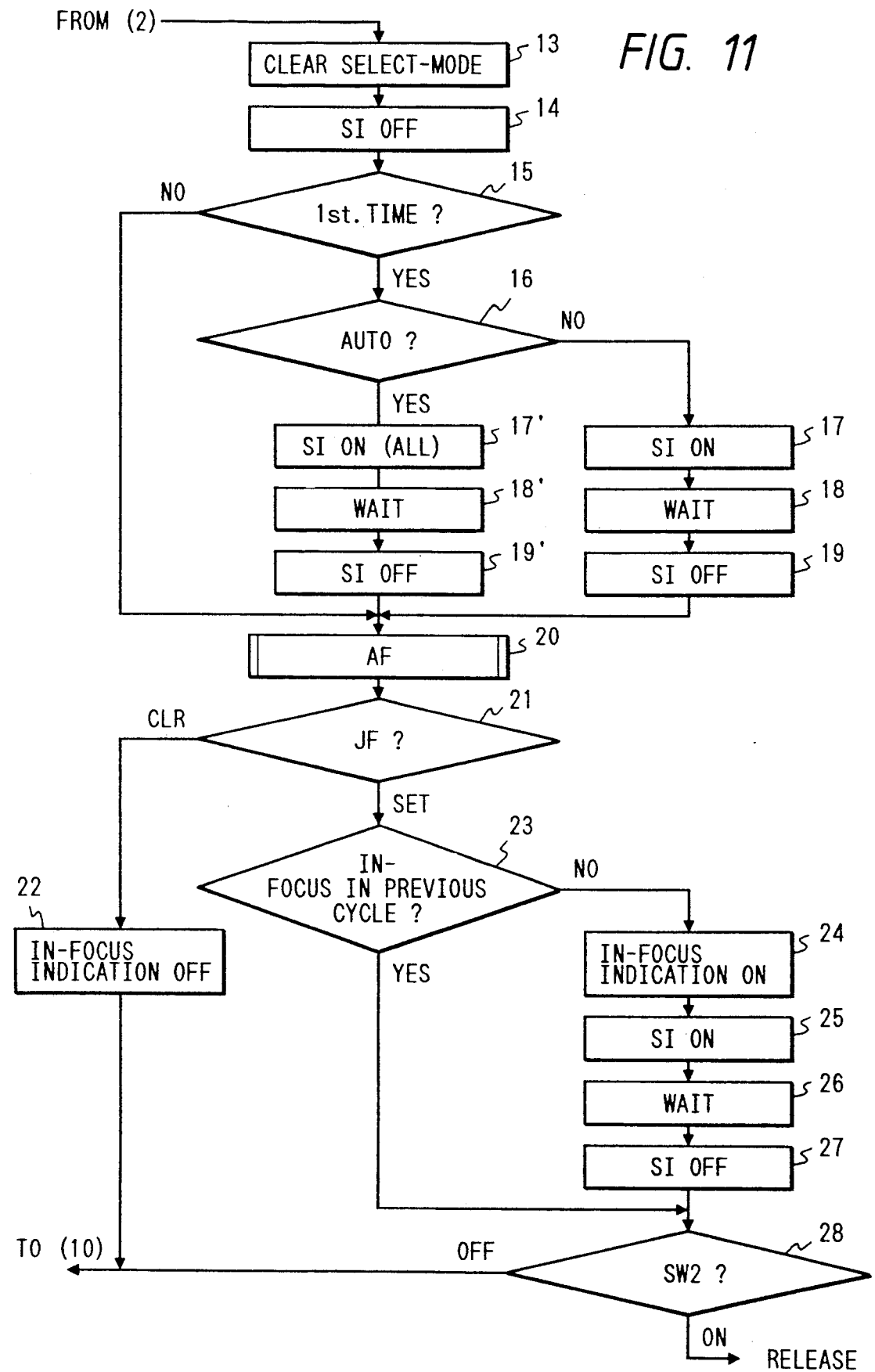
FIG. 11 is an illustration showing a modification of the flow shown in FIG. 4.

FIG. 11 is a flow chart showing another example of the flow chart of the automatic focus adjusting apparatus of the present invention shown in FIGS. 4A and 4B.

The flow chart of FIG. 11 differs from the flow shown in FIG. 4B only in that steps (17)' and (19)' are added.

The operation following this flow is substantially the same as what has been described with reference to FIGS. 4A and 4B, but the SI indication immediately after the closing of the switch SW when the automatic select mode is set differs from that in the case of FIG. 4B. That is, in the flow of FIG. 11, if at the step (16), it is judged that the mode is the automatic select mode, the steps (17)'–(19)' are executed and therefore, light emitting diodes SPIL, SPIC and SPIR are turned on for a predetermined time to thereby indicate to the photographer that the mode is the automatic select mode.

The other operations are the same as the flows shown in FIGS. 4A and 4B and therefore need not be described.

I claim:

1. A camera provided with a focus detecting device for independently detecting focus states relative to a plurality of different areas of a scene, said camera comprising:

an indicator provided inside a finder for indicating each of said different areas;
a shutter release operation member;
a designating circuit for designating a predetermined one of said different areas;
a focus detection control circuit for causing the focus detecting device to start a focus detection operation after operation of said shutter release operation member; and
an indicator control circuit for causing said indicator to indicate the area designated by said designating circuit prior to the focus detection operation performed by the focus detecting device and upon operation of said shutter release operation member, for causing said indication to stop during said focus detection operation, and for causing said indication to resume after said focus detection operation.

2. A camera according to claim 1, wherein said designating circuit designates one area by the operation of a manual operating member.

3. A camera according to claim 1, wherein said indicator control circuit causes said indicator to indicate said designated area again when the focus state of said designated area reaches an in-focus state after the focus detection operation.

4. A camera according to claim 1, wherein the focus detecting device repeatedly performs the focus detection operation during the operation of said release operation member, and wherein the indication of the designated area performed prior to the focus detection operation is done only before a first focus detection operation.

5. A camera according to claim 1, wherein said indicator superimposes each of said designated areas on a field of view of the finder.

6. A camera provided with a focus detecting device for independently detecting focus states relative to a plurality of different areas of a scene, said camera including:
 a) an indicating circuit for indicating said plurality of areas;
 b) a designating circuit for designating in a first mode an area selected by a manual operation and automatically designating in a second mode one of said areas which exhibits a predetermined focus state;
 c) a shutter release operation member; and
 d) a control circuit for causing, in said first mode, said indicating circuit to indicate the area designated by said designating circuit as well as indicating said area after the focus detecting operation is performed by said focus detecting device, and for causing, in said second mode, said indicating circuit to indicate the area designated by said designating circuit after the focus detecting operation is performed in response to an operation of said release operation member, said indicating circuit performing a different indication in the first mode than in the second mode.

7. A camera according to claim 6, wherein said indicating circuit includes a plurality of indication portions provided for each said area within a view field of a finder.

8. A camera according to claim 6, wherein the indication operation performed in response to the operation of said release operation member in said first mode is executed for a predetermined time period.

9. A camera provided with a focus detecting device for independently detecting the focus states relative to a plurality of different areas of a scene, said camera including:
 a) an indicating circuit for indicating said plurality of areas;
 b) a manual operating member;
 c) a designating circuit for designating one different area by the operation of said manual operating member, and designating all areas after the designation of each area is terminated;
 d) a focus control circuit for causing said focus detecting device to effect focus detection relative to the area designated by said designating circuit; and
 e) an indication control circuit for causing said indicating circuit to indicate said one area designated by said designating circuit, said indication control circuit inhibiting the area indication by said indicating circuit when all areas are designated by said designating circuit.

10. A camera according to claim 9, wherein said indicating circuit includes a plurality of indication portions provided for each said area within a view field of a finder.

11. A camera provided with a focus detecting device for independently detecting focus states relative to a plurality of different areas of a scene, said camera including:
 a) an indicating circuit for indicating said plurality of areas;
 b) a manual operation member;
 c) a designating circuit for designating one of said plurality of areas by an operation of said manual operation member;
 d) a release operation member; and
 e) a control circuit for causing said indicating circuit to indicate the area designated by said designating circuit for a predetermined time period, for causing said indicating circuit to cease indication during a focus detecting operation, and for causing said indicating circuit to indicate said area again when said focusing state becomes a predetermined state after focus detection operation is performed by said focus detecting circuit.

12. A camera according to claim 11, wherein said indicating circuit includes a plurality of indication portions provided for each said area within a view field of a finder.

13. A camera according to claim 11, wherein said predetermined focus state is an in-focus state.

14. A camera according to claim 8, wherein said indicating circuit includes a plurality of indication portions provided for each said area within a view field of a finder.

15. A camera provided with a focus detecting device for independently detecting focus states relative to a plurality of different areas of a scene, said camera comprising:
 an indicator for visibly indicating each of said different areas in a finder;
 a shutter release operation member;
 a designating circuit for designating a predetermined one of said areas;
 a focus detection control circuit for causing the focus detecting device to start a focus detection operation after operation of said release operation member; and
 an indication control circuit for causing said indicator to indicate the area designated by said designating circuit for a predetermined time period prior to the focus detection operation of said focus detecting device, and for stopping the indication during said focus detecting operation.

16. A camera according to claim 15, wherein said focus detecting device repeatedly performs the focus detection operation during the operation of said release operation member, and wherein the indication of the designated area performed prior to the focus detection operation is done only before a first focus detection operation.

17. A camera according to claim 15, wherein said designating circuit has a first mode in which the area can be manually designated and a second mode in which the area is automatically designated, and wherein said indication control circuit is set to be operative in said first mode and set to be inoperative in said second mode.

* * * * *

UNITED STATES PATENT AND TRADEMARK OFFICE
CERTIFICATE OF CORRECTION

PATENT NO. : 5,307,112
DATED : April 26, 1994
INVENTOR(S) : KEISUKE AOYAMA

It is certified that error appears in the above-indentified patent and that said Letters Patent is hereby corrected as shown below:

COLUMN 3:

line 14, change "forwardly" to --forward--;

line 17, change "rearwardly" to --rearward--;

line 26, "a" should read --as--;

line 29, "Of" should read --of--;

line 32, "a" should read --at--; and line 37, "as" should read --is--.

COLUMN 6:

line 2, change "$\phi$SEL1" to --SEL1--.

Signed and Sealed this

Twenty-fifth Day of October, 1994

Attest:

BRUCE LEHMAN

*Attesting Officer*     *Commissioner of Patents and Trademarks*